(12) United States Patent
Ijeri et al.

(10) Patent No.: US 12,448,526 B2
(45) Date of Patent: Oct. 21, 2025

(54) CONJUGATED POLYMER COMPOSITIONS, ARTICLES THEREOF, AND METHODS THEREOF

(71) Applicant: THE BOEING COMPANY, Chicago, IL (US)

(72) Inventors: Vijaykumar Ijeri, Mumbai (IN); Stephen P. Gaydos, St. Louis, MO (US); Patrick J. Kinlen, Fenton, MO (US); Sathiyanarayanan Sadagopan, Karaikudi (IN); Arunchandran Chenan, Kasaragod (IN); Jeyaram Ramachandran, Karaikudi (IN)

(73) Assignee: THE BOEING COMPANY, Arlington, VA (US)

( * ) Notice: Subject to any disclaimer, the term of this patent is extended or adjusted under 35 U.S.C. 154(b) by 700 days.

(21) Appl. No.: 17/407,877

(22) Filed: Aug. 20, 2021

(65) Prior Publication Data

US 2022/0112380 A1  Apr. 14, 2022

Related U.S. Application Data

(60) Provisional application No. 63/089,436, filed on Oct. 8, 2020.

(51) Int. Cl.
*C09D 5/08* (2006.01)
*C09D 7/43* (2018.01)
(Continued)

(52) U.S. Cl.
CPC .............. *C09D 5/082* (2013.01); *C09D 7/43* (2018.01); *C09D 7/61* (2018.01); *C09D 7/63* (2018.01); *C09D 163/00* (2013.01)

(58) Field of Classification Search
CPC combination set(s) only.
See application file for complete search history.

(56) References Cited

U.S. PATENT DOCUMENTS 5,853,621 A   12/1998  Miller et al.
6,099,757 A *  8/2000  Kulkarni .................. C09D 5/24
                                              252/500

(Continued)

FOREIGN PATENT DOCUMENTS

CA       2011189 C    10/2000
CN       1127482 A     7/1996
(Continued)

OTHER PUBLICATIONS

CN 105368268 A, (English Language Abstract). (Year: 2016).*

(Continued)

*Primary Examiner* — Joseph D Anthony
(74) *Attorney, Agent, or Firm* — MH2 Technology Law Group LLP

(57) ABSTRACT

The present disclosure provides compositions, articles thereof, and methods of forming compositions. In at least one aspect, a composition includes (1) an epoxy, (2) an amino or amido hardener, (3) a polyaniline, (4) a dopant selected from a triazolyl, a thiazolyl, a quinolinyl, a salicylate, a benzoate, a glycolate, a phosphate, a sulfonate, or combination(s) thereof; and (5) a pigment selected from titanium dioxide, silica, talc, mica, aluminium stearate, or combination(s) thereof. The polyaniline+dopant comprises 6 wt % or less, by total volume of the composition. The present disclosure provides substrates having a composition disposed thereon. In at least one aspect, a method includes introducing an acid form of a polyaniline to a hydroxide to form a polyaniline hydroxide. The method includes introducing a dopant to the polyaniline hydroxide to form a doped polyaniline.

19 Claims, 7 Drawing Sheets

(51) Int. Cl.
    *C09D 7/61*     (2018.01)
    *C09D 7/63*     (2018.01)
    *C09D 163/00*   (2006.01)

(56) References Cited

U.S. PATENT DOCUMENTS

| | | | |
|---|---|---|---|
| 7,033,639 | B2 | 4/2006 | Kelly et al. |
| 8,546,495 | B2 | 10/2013 | Takada et al. |
| 9,028,920 | B2 | 5/2015 | Schimpff et al. |
| 11,987,669 | B2* | 5/2024 | Ijeri .................... C08K 5/3437 |
| 2003/0065090 | A1* | 4/2003 | Kelly .................... C08F 265/04 |
| | | | 525/63 |
| 2004/0005464 | A1 | 1/2004 | Ha et al. |
| 2004/0005478 | A1 | 1/2004 | Kendig et al. |
| 2004/0035498 | A1 | 2/2004 | Kinlen |
| 2011/0049432 | A1* | 3/2011 | Lee .................... C08G 73/0266 |
| | | | 528/391 |
| 2015/0240378 | A1 | 8/2015 | Kinlen et al. |
| 2016/0090486 | A1 | 3/2016 | Kinlen et al. |
| 2018/0057722 | A1 | 3/2018 | Callahan et al. |
| 2018/0362777 | A1 | 12/2018 | Surwade |

FOREIGN PATENT DOCUMENTS

| | | | |
|---|---|---|---|
| CN | 1432033 | A | 7/2003 |
| CN | 103555137 | A | 2/2014 |
| CN | 103865361 | A | 6/2014 |
| CN | 103980798 | A | 8/2014 |
| CN | 105368268 | A | 3/2016 |
| CN | 105368304 | A | 3/2016 |
| CN | 109777259 | A | 5/2019 |
| CN | 116323818 | A | 6/2023 |
| EP | 2669315 | A1 | 12/2013 |
| JP | 2004277521 | A | 10/2004 |
| WO | 03102034 | A1 | 12/2003 |
| WO | 2018232269 | A1 | 12/2018 |

OTHER PUBLICATIONS

CN 103396547 A (English Language Abstract). (Year: 2013).*
Huntsman Technical Datasheet, "Araldite PZ 3961-1 Epoxy resin," pp. 1-5, (2013) (Year: 2013).
Huntsman Technical Datasheet, "Aradur 3986 Epoxy curing agent," pp. 1-3, (2013) (Year: 2013).
Chinese Office Action dtd Feb. 28, 2024 for Application No. 202180068865.X.
Chinese Search Report dtd Feb. 19, 2024 for Application No. 202180068865.X.
China National Intellectual Property Administration, First Office Action for Chinese Patent Application No. 202180068545.4, dated Mar. 22, 2024.
Hao Yongsheng et al: "Self-healing effect of graphene@PANI loaded with benzotriazole for carbon steel," Corrosion Science, Oxford, GB, vol. 163, dated Nov. 1, 2019 XP085978427 [Abstract Only].
PCT, Notification of Transmittal of the International Search Report and the Written Opinion of the International Searching Authority, or the Declaration of Application PCT/US2021/053323 dated Mar. 31, 2022.
Kinlen P J et al: "Emulsion Polymerization Process for Organically Soluble and Electrically Conducting Polyaniline," Macromolecules, American Chemical Society, US, vol. 31, No. 6, Mar. 24, 1998, pp. 1735-1744.
PCT, Notification of Transmittal of the International Search Report and the Written Opinion of the International Searching Authority, or the Declaration for Application PCT/US2021/053327 dated Feb. 7, 2022.
Goncalves et al, "Alkyd coatings containing polyanilines for corrosion protection of mild steel" Synthetic Metals 161 (2011) 313-323.
Indumathi et al, "Cadmium and Chromate free coating schemes for corrosion protection of 15CDV6 steel" Metal Finishing, Apr./May 2011 15-21.
Dominis et al., "Comparison of polyaniline primers prepared with different dopants for corrosion protection of steel" Progress in Organic Coatings 48 (2003) 43-49.
Grgur et al, "Corrosion of mild steel with composite polyaniline coatings using different formulations" Progress in Organic Coatings 79 (2015) 17-24.
Wessling et al, "Corrosion prevention with an organic metal (polyaniline): corrosion test results" Electrochimica Acta 44 (1999) 2139¿2147.
Armelin et al, "Corrosion protection with polyaniline and polypyrrole as anticorrosive additives for epoxy paint" Corrosion Science 50 (2008) 721-728.
Sathiyanarayanan et al, "Corrosion protection of steel by polyaniline (PANI) pigmented paint coating" Progress in Organic Coatings 53(2005) 297-301.
Siva et al, "Epoxy curing by polyaniline (PANI)—Characterization and self-healing evaluation" Progress in Organic Coatings 77 (2014) 1095-1103.
Samui et al., "Study of polyaniline containing paint for corrosion prevention" Progress in Organic Coatings 47 (2003) 1-7.
Armelin et al, "Anticorrosion performances of epoxy coatings modified with polyaniline: A comparison between the emeraldine base and salt forms" Progress in Organic Coatings 65 (2009) 88-93.
Gupta et al, "Polyaniline-lignosulfonate/epoxy coating for corrosion protection of AA2024-T3" Corrosion Science 67 (2013) 256-267.
Sathiyanarayanan et al, "Corrosion protection of steel by polyaniline blended coating" Electrochimica Acta 51 (2006) 6313-6319.
OSHA, Hexavalent Chromium, Safety and Health Topics, pulled from web Sep. 1, 2021, pp. 1-5.
ECHA, "Addressing Chemicals of Concern," European Chemicals Agency Annankatu 18, pulled from website Sep. 1, 2021, pp. 1-2.
Chinese Patent Office, Second Office Action for Chinese Patent Application No. 202180068545.4, dated Aug. 19, 2024.
Hao et al., Self-healing epoxy coating loaded with phytic acid doped polyaniline nanofibers impregnated with benzotriazole for Q235 carbon steel, Corrosion Science 151 (2019) 175-189.
Mrad et al., Effect of doping by corrosion inhibitors on the morphological properties and the performance against corrosion of polypyrrole electrodeposited on AA6061-T6, Progress in Organic Coatings 72 (2011) 511-516.
Imai, Mamoru (JP Examiner) Notice of Reasons for Refusal issued Aug. 26, 2025 in corresponding Japanese Application No. 2023-519750, 12 pages (provided in both Japanese and English).

* cited by examiner

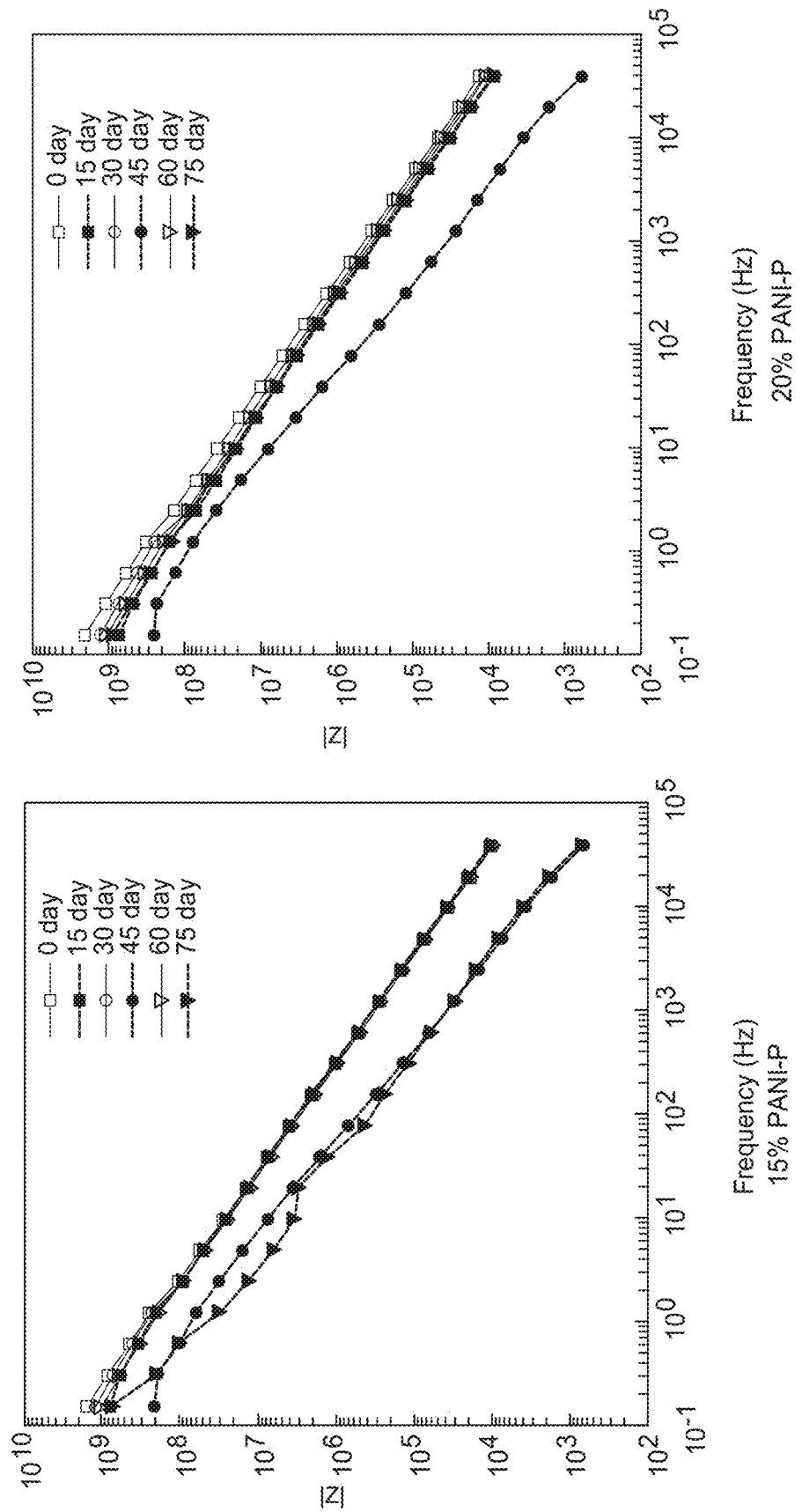

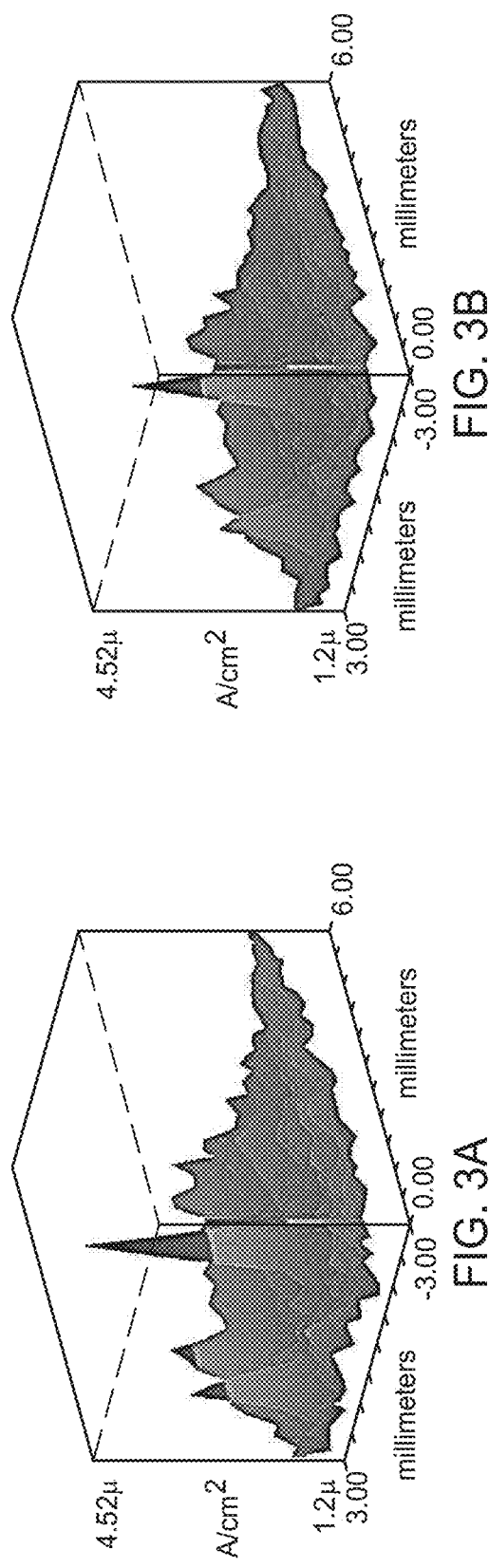
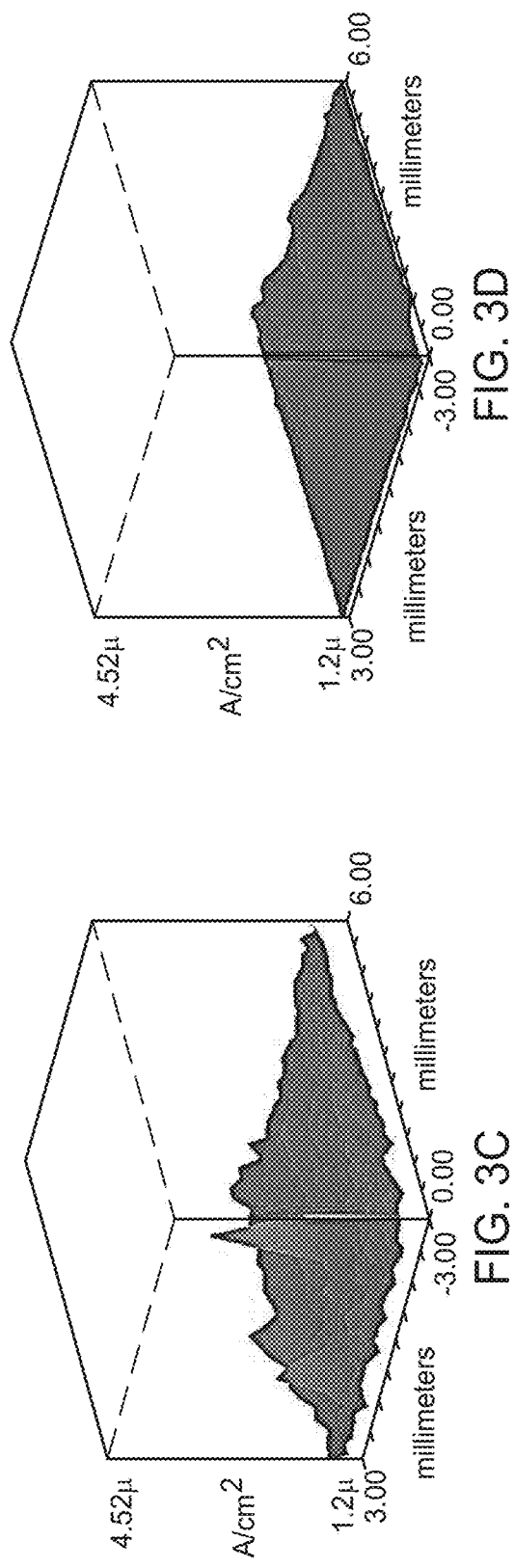
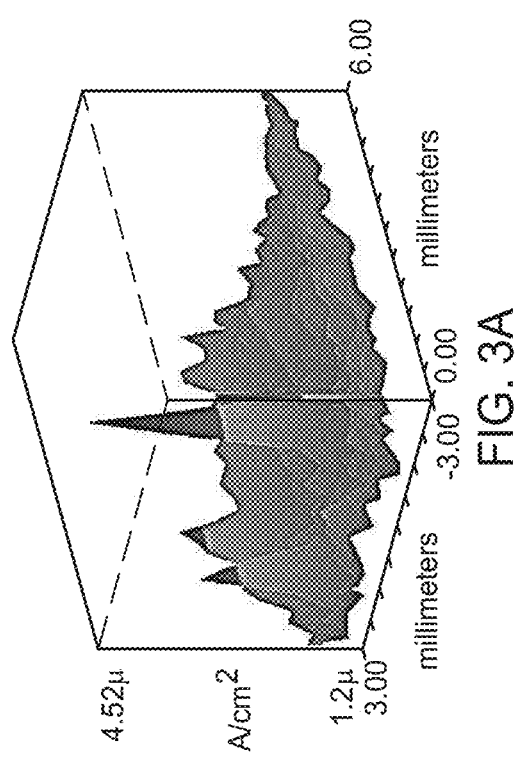
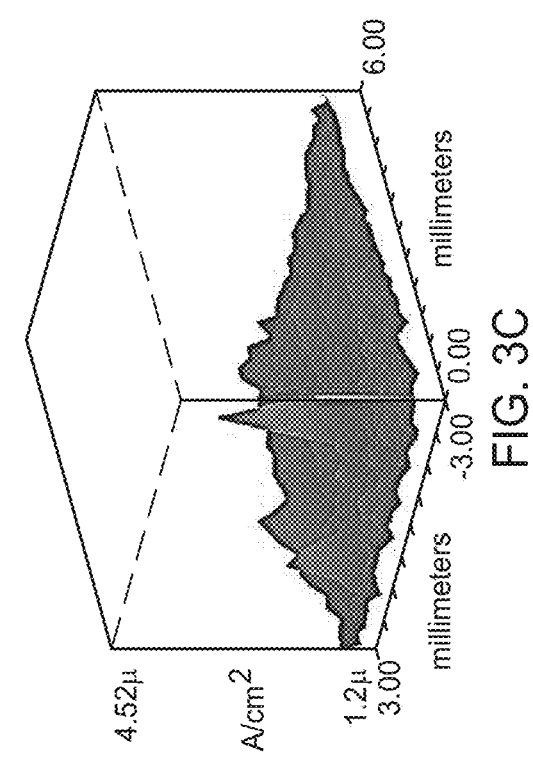
FIG. 3A
FIG. 3B
FIG. 3C
FIG. 3D

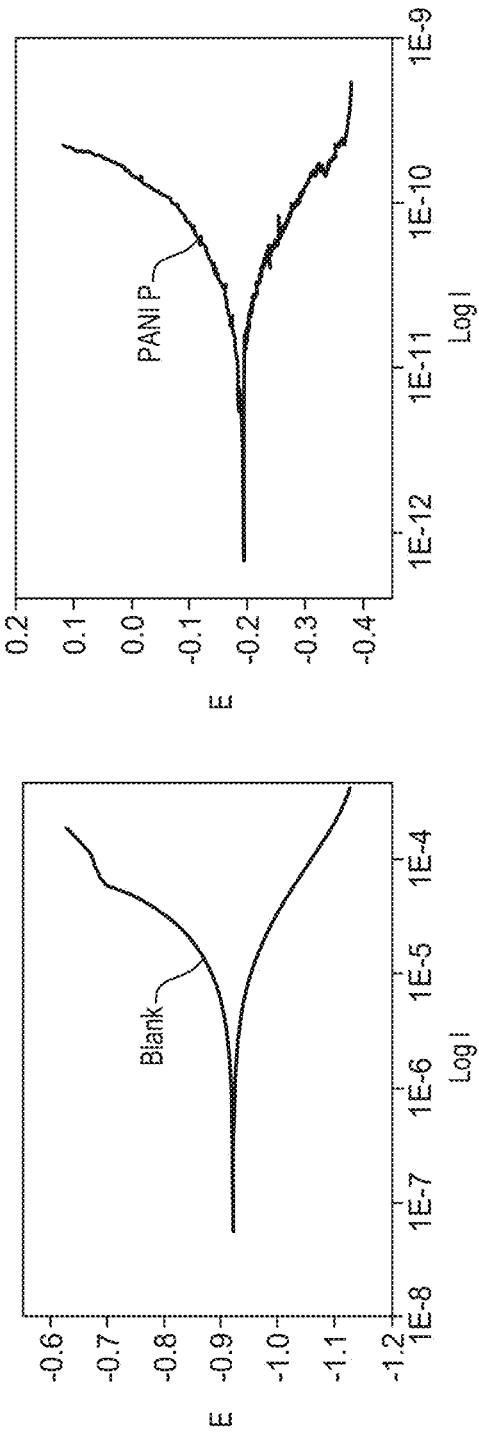
FIG. 6A
FIG. 6B
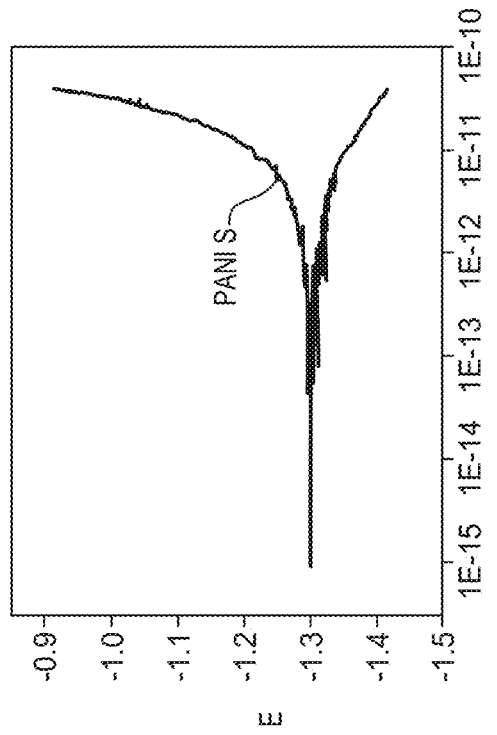
FIG. 6C
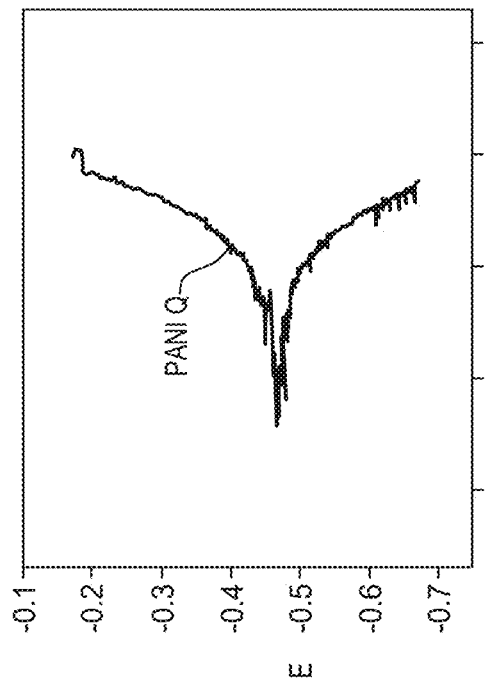
FIG. 6D

CONJUGATED POLYMER COMPOSITIONS, ARTICLES THEREOF, AND METHODS THEREOF

CROSS-REFERENCE TO RELATED APPLICATIONS

This application claims benefit of U.S. Provisional Patent Application No. 63/089,436 filed Oct. 8, 2020.

FIELD

The present disclosure provides compositions, articles thereof, and methods of forming compositions.

BACKGROUND

Organic coatings are an efficient way to protect metallic substrates from corrosion and also provide aesthetic appeal. Paints and primers form the exterior coating systems of automobiles and aircrafts.

Paint alone does not provide a robust coating for most metals as it easily flakes off of metal if applied directly to the surface. To prevent this, primer is used. Primers are designed to fill in the microscopic gaps in the substrate, and provide for corrosion protection and adhesion. When applied over primer, paint adheres much better because it easily bonds with the primer. Without a primer, most coatings on metals would begin to flake, as well as corrode once exposed to atmosphere.

Even in the absence of defects, a sufficient amount of ions may penetrate through the coatings so that corrosion at the metal interface may occur. Additionally, defects may be caused by physical means, such as through impact by sand particles, stones or scratches, during normal maintenance and operation of vehicles or equipment. In order to limit corrosion, corrosion inhibiting pigments are added to the paints/primers and other organic coatings applied on metallic surfaces. The most efficient pigments currently used are those containing chromates (usually strontium chromate), or other salts of heavy metals like zinc or lead. But the use of chromates is being progressively decreased over time. In addition, corrosion inhibitors present in chromate coatings continuously leach out from the coating, which provides a very limited useful lifetime of the coating.

There is a need for new and improved compositions, articles having compositions, and methods for forming compositions.

SUMMARY

The present disclosure provides compositions, articles thereof, and methods of forming compositions.

In at least one aspect, a composition includes (1) an epoxy, (2) an amino or amido hardener, (3) a polyaniline, (4) a dopant selected from a triazolyl, a thiazolyl, a quinolinyl, a salicylate, a benzoate, a glycolate, a phosphate, or combination(s) thereof; and (5) a pigment selected from titanium dioxide, silica, talc, mica, aluminium stearate, or combination(s) thereof, wherein the polyaniline+dopant comprises 6 wt % or less, by volume of the composition.

In at least one aspect, a substrate has a composition disposed thereon.

In at least one aspect, a method includes introducing an acid form of a polyaniline to a hydroxide to form a neutral polyaniline or polyaniline base. The method includes introducing a dopant to the polyaniline base to form a doped polyaniline. The dopant is selected from a triazole, a thiazole, a quinoline, a salicylic acid, a benzoic acid, a glycolic acid, a phosphoric acid, or combination(s) thereof.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this present disclosure and are therefore not to be considered limiting of its scope, for the present disclosure may admit to other equally effective examples.

FIG. 2C is a Bode plot over time for Example 3 (Araldite GY 250, Aradur 2973, 5% Reactive Diluent and 15% PANI-P), according to one or more aspects.

FIG. 2D is a Bode plot over time for Example 3 (Araldite GY 250, Aradur 2973, 5% Reactive Diluent and 20% PANI-P), according to one or more aspects.

FIG. 3A is an SVET plot for Example 4 (Araldite GY 250, Aradur 2973, 5% Reactive Diluent and 20% PANI-B) at an "initial" time (5 minutes), according to one or more aspects.

FIG. 3B is an SVET plot for Example 4 (Araldite GY 250, Aradur 2973, 5% Reactive Diluent and 20% PANI-B) at 6 hours of NaCl exposure, according to one or more aspects.

FIG. 3C is an SVET plot for Example 4 (Araldite GY 250, Aradur 2973, 5% Reactive Diluent and 20% PANI-B) at 12 hours of NaCl exposure, according to one or more aspects.

FIG. 3D is an SVET plot for Example 4 (Araldite GY 250, Aradur 2973, 5% Reactive Diluent and 20% PANI-B) at 24 hours of NaCl exposure, according to one or more aspects.

FIG. 6A is a Tafel polarization curve plot for a primer coating without PANI, according to one or more aspects.

FIG. 6B is a Tafel polarization curve plot for a primer coating having PANI-P, according to one or more aspects.

FIG. 6C is a Tafel polarization curve plot for a primer coating having PANI-Q, according to one or more aspects.

FIG. 6D is a Tafel polarization curve plot for a primer coating having PANI-S, according to one or more aspects.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Figure 1:
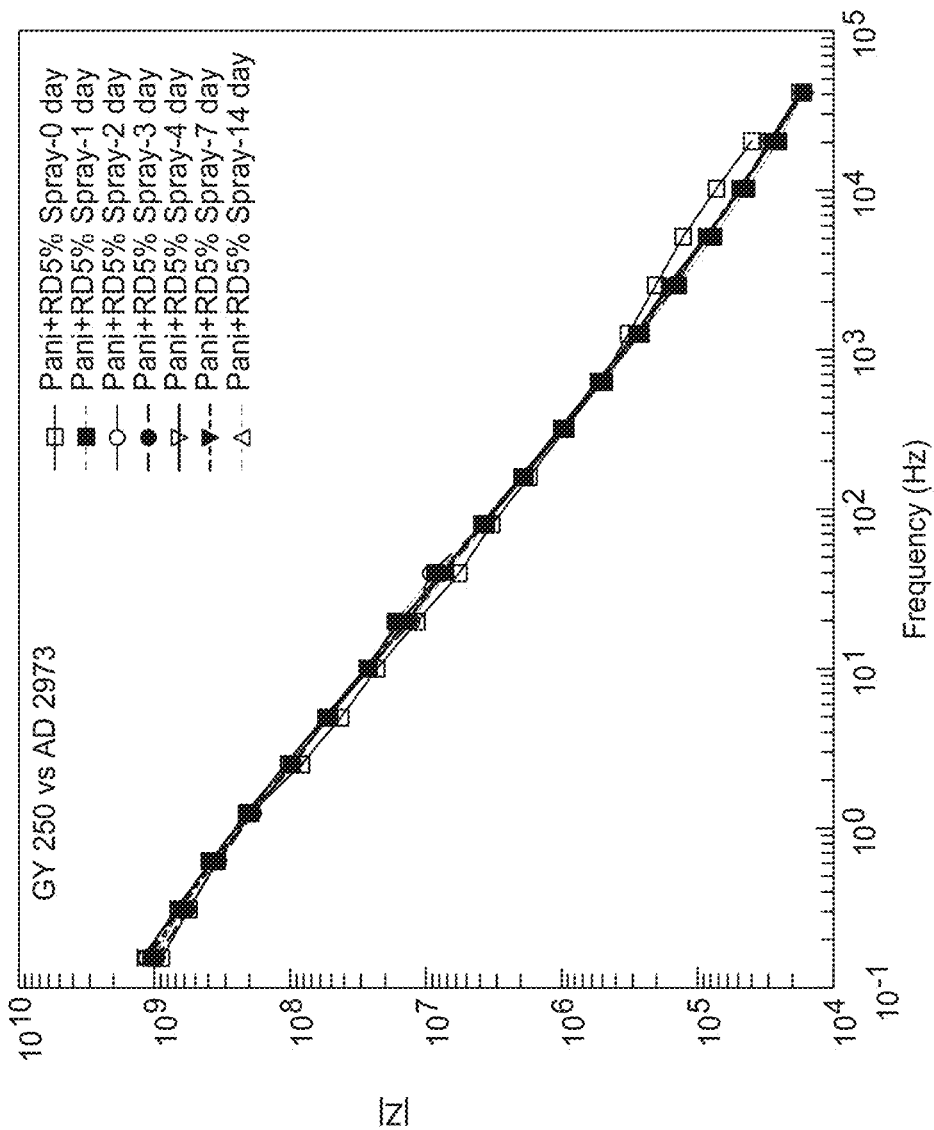
FIG. 1 is a Bode plot over time for Example 1 (5% PANI-P with Araldite GY 250, Aradur 2973 and 5% Reactive Diluent), according to one or more aspects.

The present disclosure provides compositions, articles thereof, and methods of forming compositions. Compositions of the present disclosure include (1) an epoxy, (2) amino or amido hardener, (3) a polyaniline, (4) a dopant selected from a triazolyl, a thiazolyl, a quinolinyl, a salicylate, a benzoate, a glycolate, a phosphate, or combination(s) thereof, and (5) one or more pigments selected from titanium dioxide, silica, talc, mica, aluminium stearate, or combination(s) thereof. Articles of the present disclosure include a substrate and a composition disposed thereon. Methods for forming compositions of the present disclosure can include treating a polyaniline base with a dopant selected from a triazole, a thiazole, a quinoline, a salicylate, a benzoate, a glycolic acid, a phosphate, or combination(s) thereof.

Polyanilines are conjugated polymers having alternate single and double C—C bonds along the polymer chains. The conjugation of π ("pi") electrons extends over the polymer backbone, because of which these polymers are electrically conductive and have switchable redox properties. In their oxidized form, the polymer backbone is positively charged and can bond with negatively charged ions (such as a negatively charged dopant). This phenomena is also referred to as doping. While not being bound by any particular theory, it has been discovered that molecules/ions that possess corrosion inhibition properties can be incorporated as dopants. By virtue of their redox nature, polyanilines can shift the corrosion potentials of the system and passivate the substrates.

The oxidized ("emeraldine") form of a polyaniline can couple to dopant(s) having anticorrosion properties. In the presence of a corrosive environment, the polyaniline reduces and releases the dopant(s). This chemical change promotes "self-healing" of areas of a substrate where a composition (as a layer/film) has chipped from the substrate or has otherwise been damaged. When corrosion is occurring, the corrosion changes the local potential, chemically reducing the polyaniline which releases the dopant from the polyaniline, and the dopant can then localize to the defect of the exposed substrate (as can be evidenced by an SVET scan described below). In other words, dopant is not continuously releasing from the cured composition, but can release "on demand" as corrosion of a portion of a substrate is occurring. In addition, the dopant coupled with the polyaniline reduces reactivity issues between a "free-floating" (e.g., unbonded) corrosion inhibitor (e.g., thiol-containing corrosion inhibitor) with reactive moieties of an epoxy (such as epoxide moieties).

Compositions

Compositions of the present disclosure include (1) an epoxy, (2) amino or amido hardener, (3) a polyaniline, (4) a dopant selected from a triazolyl, a thiazolyl, a quinolinyl, a salicylate, a benzoate, a glycolate, a phosphate, or combination(s) thereof, and (5) one or more pigments selected from titanium dioxide, silica, talc, mica, aluminium stearate, or combination(s) thereof.

As used herein, a "composition" can include the components of the compositions and/or the reaction product(s) of two or more components of the composition.

Compositions of the present disclosure can have a volatile organic content of about 300 g/L or less, such as about 100 g/L to about 300 g/L, such as about 200 g/L to about 250 g/L, as determined by ASTM D3960-01. A composition having a volatile organic content of about 300 g/L or less can provide lowered volatile organic content which provides environmentally preferred (e.g., friendly) compositions.

Compositions of the present disclosure can have a volume solids of about 70% or greater, such as 80% or greater, such as about 90% or greater, based on the total volume of the composition. Volume solids is calculated for weighing out the ingredients and preparing the composition. The total solid content can be determined by evaporating off the solvents. A composition having a volume solids of about 70% or greater can provide lowered volatile organic content which provides environmentally compatible (e.g., friendly) compositions.

Compositions of the present disclosure can be disposed on one or more substrates. Compositions disposed on a substrate (e.g., as a layer) can be applied from about 1 micrometer (μm) to about 100 μm in thickness, such as about 1 μm to about 10 μm in thickness, such as about 10 μm to about 80 μm, such as about 20 μm to about 60 μm, for example about 25 μm, about 35 μm, about 45 μm, about 50 μm. In at least one aspect, cured compositions have an electrochemical impedance of about $10^4 \Omega$ to about $10^9 \Omega$, such as about $10^6 \Omega$ when in contact with 3.5% NaCl solution. (This is the resistance of the coating to the ingress of NaCl. It is a measure of barrier protection. A higher value indicates better resistance.)

A substrate of the present disclosure can be a vehicle component or wind turbine component (such as turbine blade(s) or station(s)). A vehicle comprises any suitable transportation device. Vehicles include, but are not limited to, aircraft, automobiles, boats, motorcycles, satellites, rockets, missiles, etc., and therefore further include manned and unmanned aircraft, manned and unmanned spacecraft, manned and unmanned terrestrial vehicles, manned and unmanned non-terrestrial vehicles, and even manned and unmanned surface and sub-surface water-borne marine vehicles, objects, and structures.

A vehicle component may comprise one or more compositions of the present disclosure disposed on one or more surfaces of the vehicle component. A vehicle component includes, but is not limited to, any component of a vehicle, such as a structural component, such as a panel or joint of the vehicle. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Epoxies and Amino/Amido Hardeners

Compositions of the present disclosure can include one or more epoxies and one or more amino hardeners and/or one or more amido hardeners.

In at least one aspect, a composition includes ((epoxy+ amino hardener) or (epoxy+amido hardener)) in an amount of about 55 wt % to about 85 wt %, such as about 55 wt % to about 75 wt %, alternatively about 65 wt % to about 85 wt %, based on the total volume of the composition.

In at least one aspect, a composition includes one or more epoxies in an amount of about 35 wt % to about 55 wt %, such as about 35 wt % to about 45 wt %, alternatively about 40 wt % to about 50 wt %, based on the total volume of the composition. In at least one aspect, a composition includes one or more amino hardeners in an amount of about 15 wt % to about 25 wt %, such as about 15 wt % to about 20 wt %, alternatively about 18 wt % to about 24 wt %, based on the total volume of the composition. In at least one aspect, a composition includes one or more amido hardeners in an amount of about 15 wt % to about 25 wt %, such as about 15 wt % to about 20 wt %, alternatively about 18 wt % to about 24 wt %, based on the total volume of the composition.

Epoxies can include partially cured epoxies, a particular addition of epoxies, two-component epoxy resin that includes a catalyst (such as HYSOL® EA 956 epoxy resin available from Henkel Corporation of Bay Point, California), a two-liquid system that includes a resin and a hardener of the present disclosure (such as EPOFIX resin available from Struers NS of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such as a Bisphenol-A (Bis-A) or Bisphenol-F (Bis-F)-based epoxies. Bis-A epoxy resins can be available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable. In one or more aspects, an epoxy is a bisphenol-A epoxy that is Araldite GY 250 or GY 9090 available from Huntsman Advanced Materials).

Amino hardeners include polyaminoamine hardeners (such as Aradur 450 commercially available from Huntsman Advanced Materials (Monthey, Switzerland), Aradur 2973 (which is an aliphatic polyamine hardener commercially available from Huntsman Advanced Materials (Monthey, Switzerland)), a polyetheramine having a Tg of about 40° C. to about 100° C. (such as JEFFAMINE® T-403 amine or JEFFAMINE® D-230 amine), an ethyleneamine having a Tg of about 110° C. to about 125° C. (such as diethylenetriam ine, triethylenetetram ine, tetraethylenepentamine, or N-aminoethylpiperzine), a cycloaliphatic amine having a Tg of about 145° C. to about 175° C. (such as bis-(p-aminocyclohexyl)methane, diaminocyclohexane, or bis-(dimethyl-diaminocyclohexyl)methane), or an aromatic amine having a Tg of about 160° C. to about 220° C. (such as methylene dianiline, m-phenylene diamine, or diaminophenyl sulfone).

Amido hardeners include Aradur 360 (which is a polyamidoamine hardener commercially available from Huntsman Advanced Materials (Monthey, Switzerland)) or a polyamide or amidoamine having a Tg of about 40° C. to about 100° C. (such as VERSAMID® 125 polyamide or GENAMID® 490 amidoamine).

Polyanilines and Dopants

Compositions of the present disclosure can include one or more polyanilines and one or more dopants. In at least one aspect, a composition includes polyaniline+dopant in an amount of about 0.1 wt % to about 6 wt %, such as 0.5 wt % to about 3 wt %, alternatively about 3 wt % to about 5.5 wt %, based on the total volume of the composition. A composition may include polyaniline+dopant in an amount of about 1% to about 25%, such as about 5% to about 15%, alternatively about 15% to about 25%, based on the Pigment Volume Concentration of the composition. As used herein, "Pigment Volume Concentration" refers to the ratio of the volume of pigments to the volume of total nonvolatile material (total solids) present in a coating composition. Pigment Volume Concentration can be determined using ASTM D2371-19 and ASTM D2698-05 (reapproved 2015).

Pigments include $TiO_2$, Talc, Mica, Silica and Al-stearate, or combination(s) thereof.

In at least one aspect, a composition includes the polyaniline+dopant in an amount of about 0.1 wt % to about 6 wt %, such as about 2 wt % to about 4 wt %, based on the total volume of the composition.

In at least one aspect, a composition includes the polyaniline+dopant in an amount of about 1% to about 25%, such as about 10% to about 20%, based on the Pigment Volume Concentration of the composition.

A molar ratio of dopant to aniline units of a polyaniline can be about 0.1:1 to about 1:1, such as about 0.3:1 to about 1:1, such as about 0.5:1 to about 1:1, such as about 1:1.

A dopant can be selected from a triazolyl, a thiazolyl, a quinolinyl, a salicylate, a benzoate, a glycolate, a phosphate, or combination(s) thereof.

In at least one aspect, a triazolyl is selected from benzotriazole, triazole carboxylic acid, or benzotriazole sulphonic acid.

In at least one aspect, a thiazolyl is selected from one or more of benzothiazole, thiazole carboxylic acid, or mercaptobenzothiazole.

In at least one aspect, a quinolinyl is selected from 8-hydroxyquinoline or mercaptoquinoline.

In at least one aspect, a salicylate is selected from salicylic acid, hydroxybenzoic acids, or salts thereof.

In at least one aspect, a benzoate is selected from benzoate, benzoic acid, methylbenzoic acids, or salts thereof.

In at least one aspect, a glycolate is selected from glycolate or thioglycolate.

In at least one aspect, a phosphate is selected from phosphoric acid or salt(s) thereof.

Polyanilines of the present disclosure can be formed using an aniline and a phosphoric acid, sulfuric acid, or sulfonic acids.

Pigments

In at least one aspect, a composition of the present disclosure includes a pigment selected from titanium dioxide, silica, talc, mica, an aluminium stearate, or combination(s) thereof.

Pigments of the present disclosure can provide opacity to a composition. For example, the composition containing pigment(s) covers the substrate to make the covered substrate opaque.

In at least one aspect, a composition includes each of titanium dioxide, talc, mica, silica, and an aluminium stearate. For example, a composition can include titanium dioxide in an amount of about 5% to about 30%, such as about 10% to about 20%, for example about 15%, based on the Pigment Volume Concentration of the composition. A composition can include titanium dioxide in an amount of about 5 wt % to about 12 wt %, such as about 6 wt % to about 10 wt %, such as about 7 wt % to about 9 wt %, based on the total volume of the composition. A composition can include talc in an amount of about 5% to about 30%, such as about 20% to about 30%, for example about 25%, based on the Pigment Volume Concentration of the composition. A composition can include talc in an amount of about 1 wt % to about 12 wt %, such as about 2 wt % to about 10 wt %, such as about 3 wt % to about 6 wt %, based on the total volume of the composition. A composition can include mica in an amount of about 5% to about 30%, such as about 20% to about 30%, for example about 25%, based on the Pigment Volume Concentration of the composition. A composition can include mica in an amount of about 1 wt % to about 12 wt %, such as about 2 wt % to about 10 wt %, such as about 3 wt % to about 6 wt %, based on the total volume of the composition. A composition can include silica in an amount of about 5% to about 30%, such as about 20% to about 30%, for example about 28%, based on the Pigment Volume Concentration of the composition. A composition can include silica in an amount of about 0.1 wt % to about 30 wt %, such as about 7 wt % to about 20 wt %, such as about 9 wt % to about 13 wt %, based on the total volume of the composition.

A composition can include an aluminium stearate in an amount of about 1 to about 5%, such as about 1% to about 3%, for example about 2%, based on the Pigment Volume Concentration of the composition. A composition can include aluminium stearate in an amount of about 0.1 wt % to about 1 wt %, such as about 0.1 wt % to about 0.5 wt %, such as about 0.3 wt % to about 0.8 wt %, based on the total volume of the composition.

Compositions and Layers of Compositions

In at least one aspect, a method for forming a composition comprises mixing (1) an epoxy, (2) amino or amido hardener, (3) a polyaniline, (4) a dopant selected from a triazolyl, a thiazolyl, a quinolinyl, a salicylate, a benzoate, a glycolate, a phosphate, or combination(s) thereof, and (5) one or more pigments selected from titanium dioxide, silica, talc, mica, aluminium stearate, or combination(s) thereof to form a composition. Mixing can include diffusion and/or active mixing (e.g., with a stirrer). The method may include disposing (e.g., depositing) the composition onto a substrate to form a layer comprising the composition. A method can include curing the composition. The method may include dissolving one or more components of the composition in a solvent before mixing. A solvent can be a xylene, a toluene, dimethyl sulfoxide, water, or mixture(s) thereof.

A substrate can be a metal substrate made of aluminum, aluminum alloy, nickel, iron, iron alloy, steel, titanium, titanium alloy, copper, copper alloy, or mixture(s) thereof. A substrate can be a 'bare' substrate, having no plating (e.g., unplated metal), conversion coating, and/or corrosion protection between the substrate and the composition. Additionally or alternatively, a substrate can include surface oxidization. Hence, a composition can be directly disposed on the substrate and/or to a surface oxide layer on a surface of the substrate.

A secondary layer can optionally be disposed on (e.g., deposited onto) the composition (disposed on the substrate). A secondary layer can be an organic material (e.g., organic chemical compositions) configured to dispose on (e.g., adhere to) a composition. A secondary layer can include a paint, a topcoat, a polymeric coating (e.g., an epoxy coating, and/or a urethane coating), a polymeric materia. In at least one aspect, a secondary layer includes a polymer, a resin, a thermoset polymer, a thermoplastic polymer, an epoxy, a lacquer, a polyurethane, a polyester, or combination(s) thereof. A secondary layer can additionally include a pigment, a binder, a surfactant, a diluent, a solvent, a particulate (e.g., mineral fillers), fibers (e.g., carbon, aramid, and/or glass fibers), or combination(s) thereof.

Composition thickness (e.g., a layer including a composition) can be utilized to tune one or more of (1) corrosion resistance, (2) barrier property, and (3) electrochemical resistance of the cured composition disposed on a substrate.

Compositions of the present disclosure may be disposed on (e.g., deposited onto) a surface, such as a surface of a vehicle component, by any suitable method, such as dipping, spraying, brush coating, spin coating, roll coating, doctor-blade coating, or combination(s) thereof. The composition may be cured after application to a vehicle component surface at ambient temperatures over a period of time. For example, a composition may be deposited onto a vehicle component. Once deposited, the composition may be heated to cure the composition. An elevated temperature may be used to accelerate the curing process. Heating promotes evaporation of one or more solvents (if present) in the composition, such as xylenes, toluene, and/or water.

Curing the composition may include raising the temperature of the composition to a peak curing temperature and maintaining the peak curing temperature for about 1 second to about 48 hours, such as about 1 hour to about 10 hours. The peak curing temperature can be about room temperature to about 100° C., such as between about 50° C. and about 90° C., for example 50° C., 60° C., 70° C., 80° C., 90° C. The curing time can be about 4 hours to about 200 hours at ambient temperature (20-30° C.)

Disposing (e.g., depositing) the composition onto the substrate may be achieved by spin-coating the composition onto a surface of a substrate, such as a vehicle component, at a rate of about 100 rpm to about 4,000 rpm, such as about 500 rpm to about 2,000 rpm, for example about 500 rpm, about 1,000 rpm, about 1,500 rpm, about 2,000 rpm.

Alternatively, disposing the composition onto the substrate is achieved by spraying the composition onto a surface of a substrate, such as a vehicle component using any suitable composition spray apparatus or by brushing the composition on to the surface of a substrate or by immersing the substrate into the composition.

Cured Composition Thickness. Coating thickness may be measured by Eddy current based probes from ELCOMETER or from DEFELSKO.

Electrochemical Impedance Spectroscopy (EIS). EIS uses a variable frequency alternating current source to probe the changes to a sample's impedance at different frequencies. Impedance, similar to a resistor, is the lag between an applied alternating current and the measured voltage change. Electrical circuit components respond in frequency dependent ways, which can be used to identify specific properties of a coating being measured. True ohmic resistors respond identically to direct current (DC) and alternating current (AC) sources, and thus show no frequency-dependent resistive response. Capacitors (as well as more complex electrical components) have a frequency-dependent response; at low frequencies the impedance is very high but at high frequencies the electrical impedance is lower. In the analysis of EIS data, a predicted model, known as the equivalence circuit model, is made composed of real and approximated electrical components to closely approximate the sample system. The model's calculated impedance spectra are then compared to the measured spectra.

Composition Applications

Compositions of the present disclosure may be deposited onto a surface of a substrate, such as a vehicle component. Vehicle components include a structural component such as a panel or joint of an aircraft, automobile, ship, etc.

Examples of a vehicle component include an airfoil (such as a rotor blade), fuselage, wings, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

As compared to conventional coatings, compositions and methods of the present disclosure provide reduced leach out of corrosion inhibitor over time in part, because the corrosion inhibitive dopant can be coupled with polyaniline (e.g., emaraldine form of polyaniline) and released from the polyaniline in response to a corrosive environment.

Aspects

The present disclosure provides, among others, the following aspects, each of which may be considered as optionally including any alternate aspects.

Clause 1. A composition comprising:
an epoxy,
an amino or amido hardener,
a polyaniline,
a dopant selected from a triazolyl, a thiazolyl, a quinolinyl, a salicylate, a benzoate, a glycolate, a phosphate, or combination(s) thereof; and
a pigment selected from titanium dioxide, silica, talc, mica, aluminium stearate, or combination(s) thereof, wherein the polyaniline+dopant comprises 6 wt % or less, by volume of the composition.

Clause 2. The composition of Clause 1, wherein the polyaniline is an emeraldine form of the polyaniline.

Clause 3. The composition of Clauses 1 or 2, wherein the composition has a volatile organic content 300 g/L or less.

Clause 4. The composition of any of Clauses 1 to 3, wherein the composition has a volume solids of about 70% or greater, based on the total volume of the composition, as determined by weighing out the ingredients and preparing the composition. The total solid content can be determined by evaporating off the solvents.

Clause 5. The composition of any of Clauses 1 to 4, wherein the composition comprises (epoxy+amino hardener and/or amido hardener) in an amount of about 45 wt % to about 85 wt %, based on the total volume of the composition.

Clause 6. The composition of any of Clauses 1 to 5, wherein the composition comprises one or more epoxies in an amount of about 40 wt % to about 55 wt %, based on the total volume of the composition.

Clause 7. The composition of any of Clauses 1 to 6, wherein the composition comprises amino hardener in an amount of about 15 wt % to about 21 wt %, based on the total volume of the composition.

Clause 8. The composition of any of Clauses 1 to 7, wherein the composition comprises amido hardener in an amount of about 15 wt % to about 21 wt %, based on the total volume of the composition.

Clause 9. The composition of any of Clauses 1 to 8, wherein the epoxy is a bisphenol-A epoxy or bisphenol-F epoxy.

Clause 10. The composition of any of Clauses 1 to 9, wherein the composition comprises polyaniline+dopant in an amount of about 0.1 wt % to about 6 wt %, based on the total volume of the composition.

Clause 11. The composition of any of Clauses 1 to 10, wherein the composition comprises polyaniline+dopant in an amount of about 1% to about 25%, based on the Pigment Volume Concentration of the composition.

Clause 12. The composition of any of Clauses 1 to 11, a molar ratio of dopant to aniline units of a polyaniline is about 0.3:1 to about 1:1.

Clause 13. The composition of any of Clauses 1 to 12, wherein the dopant is a triazolyl selected from benzotriazole, triazole carboxylic acid, or benzotriazole sulphonic acid.

Clause 14. The composition of any of Clauses 1 to 13, wherein the dopant is a thiazolyl selected from one or more of benzothiazole, thiazole carboxylic acid, or mercaptobenzothiazole.

Clause 15. The composition of any of Clauses 1 to 14, wherein the dopant is a quinolinyl selected from 8-hydroxyquinoline or mercaptoquinoline.

Clause 16. The composition of any of Clauses 1 to 15, wherein the dopant is a salicylate selected from salicylic acid, hydroxybenzoic acids, or salts thereof.

Clause 17. The composition of any of Clauses 1 to 16, wherein the dopant is a benzoate selected from benzoic acid, methylbenzoic acids, or salts thereof.

Clause 18. The composition of any of Clauses 1 to 17, wherein the dopant is a glycolate selected from glycolate or thioglycolate.

Clause 19. The composition of any of Clauses 1 to 18, wherein the dopant is a phosphate selected from phosphoric acid or salt(s) thereof.

Clause 20. The composition of any of Clauses 1 to 19, wherein the composition comprises the pigment in an amount of about 10 wt % to about 50 wt %, based on the total volume of the composition.

Clause 21. The composition of any of Clauses 1 to 20, wherein the composition comprises the pigment in an amount of about 20% to about 40%, based on the total volume of the composition.

Clause 22. The composition of any of Clauses 1 to 21, wherein the composition comprises the titanium dioxide, the silica, the talc, the mica, and the aluminium stearate.

Clause 23. The composition of any of Clauses 1 to 22, wherein the composition comprises titanium dioxide in an amount of about 10% to about 25%, based on the Pigment Volume Concentration of the composition, or in an amount of about 5 wt % to about 14 wt %, based on the total volume of the composition.

Clause 24. The composition of any of Clauses 1 to 23, wherein the composition comprises talc in an amount of about 15% to about 30%, based on the Pigment Volume Concentration of the composition, or in an amount of about 6 wt % to about 12 wt %, based on the total volume of the composition.

Clause 25. The composition of any of Clauses 1 to 24, wherein the composition comprises mica in an amount of about 5% to about 30%, based on the Pigment Volume Concentration of the composition, or in an amount of about 2 wt % to about 12 wt %, based on the total volume of the composition.

Clause 26. The composition of any of Clauses 1 to 25, wherein the composition comprises silica in an amount of about 20% to about 30%, based on the Pigment Volume Concentration of the composition, or in an amount of about 8 wt % to about 13 wt %, based on the total volume of the composition.

Clause 27. The composition of any of Clauses 1 to 26, wherein the composition comprises aluminium stearate in an amount of about 1% to about 3%, based on the Pigment Volume Concentration of the composition, or in an amount of about 0.1 wt % to about 0.6 wt %, based on the total volume of the composition.

Clause 28. A substrate comprising the composition of any of Clauses 1 to 27 disposed thereon.

Clause 29. The substrate of Clause 28, wherein the cured composition thereon has a thickness of about 5 μm and about 100 μm.

Clause 30. The substrate of Clauses 28 or 29, wherein the cured composition has an electrochemical impedance greater than $10^6\Omega$ when in contact with 3.5% NaCl solution.

Clause 31. The substrate of any of Clauses 28 to 30, wherein the substrate is a vehicle component selected from an airfoil, fuselage, an auxiliary power unit, a nose of an aircraft, a fuel tank, a tail cone, a panel, a coated lap joint between two or more panels, wings, a wing-to-fuselage assembly, a structural aircraft composite, a fuselage body-joint, or a wing rib-to-skin joint.

Clause 32. The substrate of any of Clauses 28 to 31, wherein the substrate comprises a metal substrate made of aluminum, aluminum alloy, nickel, iron, iron alloy, steel, titanium, titanium alloy, copper, copper alloy, or mixture(s) thereof.

Clause 33. The substrate of any of Clauses 28 to 32, wherein the substrate comprises aluminum alloys.

Clause 34. A method comprising:
  introducing an acid form of a polyaniline to a hydroxide to form a polyaniline hydroxide;
  introducing a dopant to the polyaniline hydroxide to form a doped polyaniline, wherein the dopant is selected from a triazole, a thiazole, a quinoline, a salicylic acid, a benzoic acid, a glycolic acid, a phosphoric acid, or combination(s) thereof.

Clause 35. The method of Clause 34, wherein the hydroxide is 1 M ammonium hydroxide.

EXAMPLES

Compositions can be substantially free of chromates and other heavy metals. The base composition can include commonly used epoxy resins, amine or amide based hardeners and pigments. Polyaniline, a conjugated polymer with dopants form the active pigment in the coating.

To form the binder component of the primer, medium viscosity unmodified epoxy resins based on bisphenol A (e.g. Huntsman Araldite GY 250 or GY 9090) were used with aliphatic polyamine hardeners (e.g., Aradur 2973) or polyamidoamine adducts (e.g. Huntsman Aradur 450). Reactive Diluents (RD) or solvents were used to change the viscosity of the primer composition.

Pigments such as titanium dioxide, talc, mica, and silica were used to impart properties such as opacity, viscosity, film strength, permeability, etc. Aluminium stearate acts as thickening or suspension agent. Polyaniline is the active corrosion inhibiting pigment.

While formulating paint compositions, the Volume Solids—VS (percentage of solid portion in the liquid paint) and Pigment Volume Concentration—PVC (percentage of pigments within the solid portion) were fixed.

To achieve a VOC of less than 300 g/L of the paint, the VS is preferably >80%. The PVC for the primer composition is preferably 20-30. The pigments mentioned above constitute the PVC, which is fixed at 20 in this study.

The words paint and primer are used interchangeably in this disclosure.

Surface preparation and coating: Al alloy AA 2024 surface was pre-treated by using commercial conversion coating (SurTec 650) as per MIL-DTL-5541. The primer was applied over the conversion coated Al alloy and cured in air for 10 days before testing. The coatings were prepared with and without the conjugated polymer polyaniline—dopants (adducts) and named as follows:
  1) PANI—Polyaniline
  2) PANI (D)—Polyaniline De-doped
  3) PANI (P)—Polyaniline Phosphate
  4) PANI (B)—Polyaniline Benzoate
  5) PANI (S)—Polyaniline Salicylate
  6) PANI (Q)—Polyaniline Quinoline
  7) PANI (BTA)—Polyaniline Benzotriazole
  8) PANI (MBT)—Polyaniline Mercapto Benzothiazole
  9) Blank—without PANI Synthesis of Polyaniline—Dopants (Adducts)

1M (91.2 ml) distilled aniline was dissolved in 500 ml of 1M solution of phosphoric acid (57.6 ml). Pre-cooled 1M (45.6 gm/120 ml de-ionised water) solution of ammonium per sulphate (APS) was added drop-wise to the pre-cooled aniline-acid mixture for about 1.5 h with constant stirring. The reaction was conducted at 5±2° C. After the addition, the stirring was continued for 2 h to ensure the completion of polymerization. Dark green coloured polyaniline is obtained, confirming the formation of phosphate doped PANI-(P). PANI-(P) thus formed was filtered and repeatedly washed (three times) with distilled water to remove excess acid. The PANI-(P) was dried in oven at about 80° C. for 2 h. The dried PANI-(P) was fine ground using a mortar and pestle.

De-Doping of PANI

The synthesised PANI-(P) was de-doped by mixing it and stirring in 1 M ammonium hydroxide for 2 h. The de-doped polyaniline PANI-(D) was filtered, repeatedly washed (three times) in de-ionized water and dried.

Synthesis of PANI with Various Dopants/Adducts

The re-doping of PANI (D) was made by mixing the PANI (D) in 1 benzoic acid (3 gm/1000 ml de-ionized water), salicylic acid (2.48 gm/1000 ml de-ionized water), benzotriazole (5 gm/1000 ml de-ionized water), 8-hydroxy quinoline (6 gm/1000 ml of 1:1 ethanol water mixture) and 2-mercaptobenzothiazole (190 mg/1000 ml de-ionized water) and stirring for 4 h. The re-doped PANI was filtered and repeatedly washed (three times) with distilled water and dried in oven at 60° C. for 2 h. Thus doped PANI or PANI adducts, PANI (B), PANI (S), PANI BTA), PANI (Q), PANI (MBT) were obtained.

Electrochemical Evaluation of the Primer Coatings

The following tests were performed to evaluate the self-healing and corrosion protection properties of the coatings.
  1) Electrochemical Impedance Spectroscopy
  2) Corrosion current mapping by Scanning Vibrating Electrode Technique (SVET)
  3) Measuring corrosion current from Tafel curves Example Compositions A typical composition of 100 ml of liquid primer is given below. Here it is to be noted that PANI (5%) means the polyaniline-dopant content is 5% of the PVC; and not 5% of the entire volume or mass of paint. Similarly for $TiO_2$, Talc, etc.

TABLE 1

| Name | Quantity |
|---|---|
| Resin | 39.9 ml |
| Reactive Diluent (5%) | 2.1 ml |
| Hardener | 18 ml |
| Solvent | 25 ml |

TABLE 1-continued

| Name | Quantity |
|---|---|
| PANI (5%) | 1.2 gm |
| TiO$_2$(15%) | 8.51 gm |
| Talc (25%) | 10.39 gm |
| Mica (25%) | 10.13 gm |
| Silica (28%) | 11.13 gm |
| Aluminum stearate (2%) | 0.3 gm |

The VOC obtained through such compositions was 200-250 g/L. PANI-dopants, Resins and hardeners were varied during the study. The pigments (weighed as per the calculations) were pre-mixed first using a mortar and pestle. The resin was slowly added to this mixture with continuous mixing. The solvent and reactive diluent was slowly added while mixing. The entire mixture was thoroughly ground for 30 minutes. A drop of the paint prepared so far was taken from this and put in the Hegmann Gauge and the fineness of grind was tested. If the fineness is less than 7, the grinding will be continued further for another 15 minutes and fineness tested. This is continued till the fineness of dispersion of paint was >7 in Hegmann gauge. The paint was applied over trichrome (Sur Tec 650) conversion coated AA 2024 alloy by spray/brush and allowed to cure for 10 days.
Electrochemical Impedance Spectroscopy—I Electrochemical Impedance spectroscopy was used for continuously monitoring the performance of the coatings exposed to a specific corrosive environment (in this case 3.5 wt % NaCl) by measuring the coating resistance. Higher coating resistance means lower permeability and better protection. Also the existence of single slope in Bode plot indicates single time constant corresponding to coating resistance and capacitance alone. Occurrence of two slopes confirms the existence of two time constants which means the existence/initiation of corrosion process on the metal surface.

A glass tube of 1.2 cm diameter of length ~3 cm was fixed on the coated aluminium alloy with an adhesive and the exposed area was 1.1 cm$^2$ to the solution. The solution of 3.5 wt % NaCl was poured into the glass tube. A platinum foil and a saturated calomel electrode were placed inside the glass tube. Paint was removed in one of the corners of the painted panels to make working electrode contact. This constitutes a three electrode assembly.

The assembly was connected to an electrochemical impedance analyzer. Impedance measurements were carried out in the frequency range of 100 KHz to 0.01 Hz with an A.C. amplitude of 20 mV for different immersion time duration. From the impedance plots, the coating resistance ($R_c$) and the coating capacitance (C) values were calculated by fitting the experimental values with the simple Randles equivalent circuit using Zsimpwin software. (Princeton Applied Research).

The percentage of PANI-dopant mentioned in the following examples, refer to % of PVC (Pigment Volume Concentration)

Example 1: 5% PANI-P with Araldite GY 250, Aradur 2973 and 5% Reactive Diluent Reactive diluents are used to lower viscosity, usually they are mono-, di-, or tri-functional glycidyl ethers. Examples include Araldite DY-E, Araldite DY-D, Araldite DY 025. The Reactive Diluent used in Example 1 was Araldite DY3601, commercially available from Huntsman Advanced Materials, Woodlands, Texas.

Bode plot for Coating resistance: High coating resistance of the order of 10$^8$ ohms (at low frequency) over a period of 14 days is considered good corrosion resistive coating. FIG. 1 is a Bode plot over time for Example 1 (5% PANI-P with Araldite GY 250, Aradur 2973 and 5% Reactive Diluent), according to one or more aspects.

Example 2: 5% PANI-P with Araldite GY 9090, Aradur 2963 and 5% Reactive Diluent Coating resistance was calculated as described above for coatings prepared from composition of example 2. Coating thickness was ~50 microns. High coating resistance of the order >10$^6$ ohms over a period of 21 days is indicative of good barrier properties that should result in good corrosion protection.

TABLE 2

| | Coating Resistance, $R_c$ (Ohms) | |
|---|---|---|
| Days | Brush application | Spray application |
| 0 | 1.35 × 10$^8$ | 1.41 × 10$^9$ |
| 1 | 2.21 × 10$^8$ | 1.98 × 10$^8$ |
| 2 | 1.92 × 10$^8$ | 4.65 × 10$^8$ |
| 3 | 7.84 × 10$^7$ | 4.73 × 10$^8$ |
| 4 | 9.41 × 10$^8$ | 4.37 × 10$^7$ |
| 7 | 4.62 × 10$^9$ | 2.52 × 10$^8$ |
| 14 | 1.06 × 10$^8$ | 2.47 × 10$^9$ |
| 21 | 8.72 × 10$^8$ | 5.50 × 10$^7$ |
| VOC/1000 ml | 179 | |
| Viscosity (Cst) | 524 | |

Example 3: Araldite GY 250, Aradur 2973, 5% Reactive Diluent and PANI-P

The Bode plots for coating without PANI shows decreased coating resistance, compared to those with 10, 15, 20% PANI-P. This shows the effect of the corrosion inhibition pigment PANI. (FIG. 2)

Figures 2A, 2B:
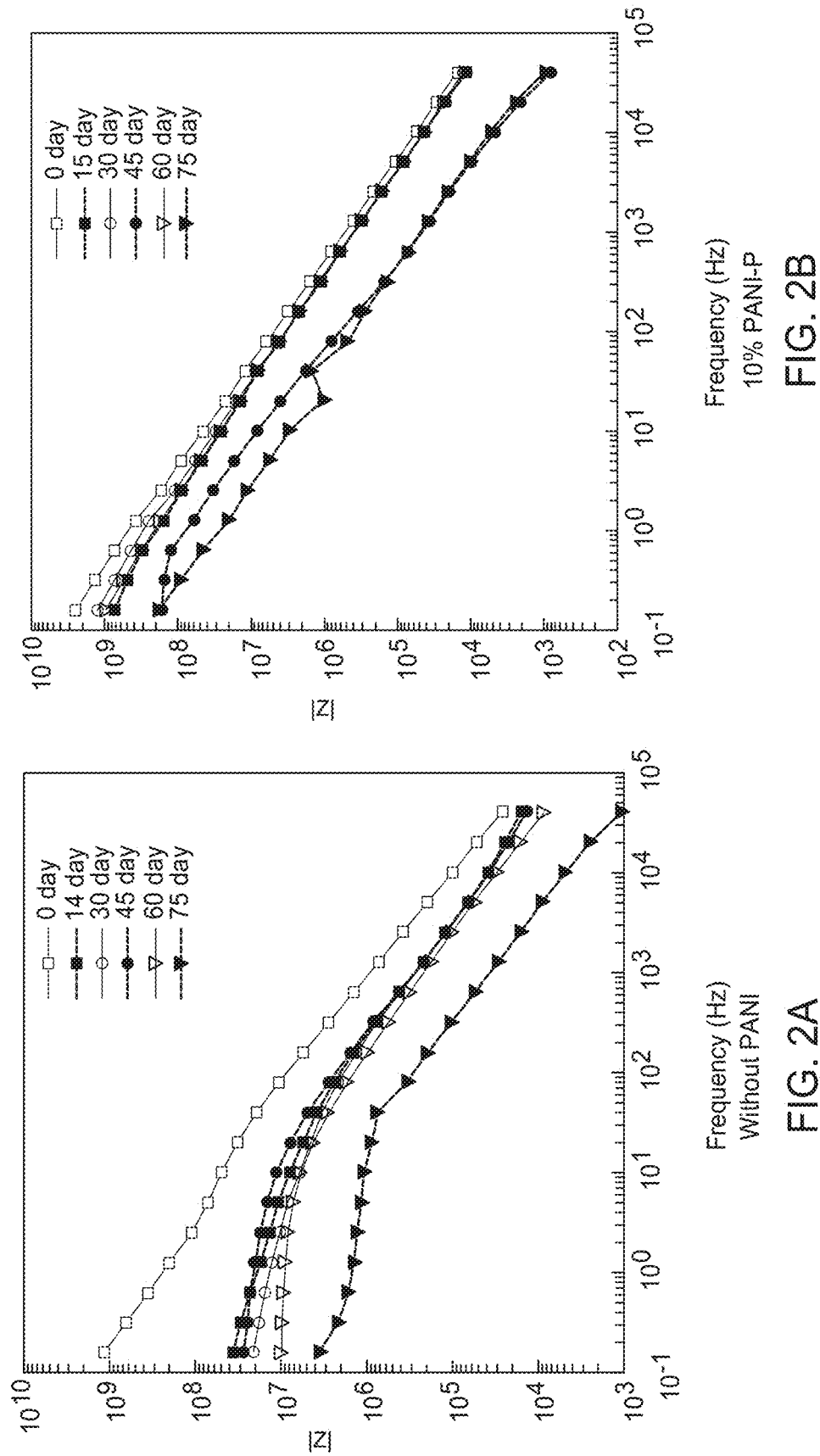
FIG. 2A is a Bode plot over time for Example 3 (Araldite GY 250, Aradur 2973, 5% Reactive Diluent) but without PANI-P, according to one or more aspects.
FIG. 2B is a Bode plot over time for Example 3 (Araldite GY 250, Aradur 2973, 5% Reactive Diluent and 10% PANI-P), according to one or more aspects.

FIG. 2A is a Bode plot over time for Example 3 (Araldite GY 250, Aradur 2973, 5% Reactive Diluent) but without PANI-P, according to one or more aspects. FIG. 2B is a Bode plot over time for Example 3 (Araldite GY 250, Aradur 2973, 5% Reactive Diluent and 10% PANI-P), according to one or more aspects. FIG. 2C is a BODE plot over time for Example 3 (Araldite GY 250, Aradur 2973, 5% Reactive Diluent and 15% PANI-P), according to one or more aspects. FIG. 2D is a Bode plot over time for Example 3 (Araldite GY 250, Aradur 2973, 5% Reactive Diluent and 20% PANI-P), according to one or more aspects.

High coating resistance of the order >10$^7$ ohms over a period of 60 days is indicative of good corrosion protection.

TABLE 3

| Coating | Rc (Ohms) after 60 days |
|---|---|
| Blank | 3.02 × 10$^6$ |
| 10% PANI-P | 2.39 × 10$^7$ |
| 15% PANI-P | 3.46 × 10$^7$ |
| 20% PANI-P | 4.82 × 10$^8$ |

Scanning Vibrating Electrode Technique (SVET)

For measurements by SVET method, a mold is first prepared with polyvinylchloride material by using Araldite resin. Then Al alloy piece of size 1 sq. cm is placed over mould and fixed using araldite resin. The test area was approximately 10 mm×10 mm and the rest of the surface was masked in order to avoid interference. After that the surface of the Al alloy in the mold is prepared and coated in similar manner as the panels mentioned above. The epoxy primer was applied over the surface treated AA 2024 alloy by spray method. After the curing period of 8 days, an artificial defect (small pin hole) is created in the coating and SVET is used to observe the surface for corrosion and self-healing ability.

All surfaces were assumed flat and so the 4 points height scan method was employed to adjust the 150 μm distance between vibrating probe and the coated metal surface. The primary result of the SVET (surface potential data) has been calibrated upon operating functions and used in producing the current density. Scans were performed at different intervals of time.

The results indicated that the occurrence of a major current spike at the defect area (due to corrosion) gets accelerated in the case of PANI free coating (i.e. Blank) while the PANI (all dopants) containing coatings suppresses the initial spike with time as demonstrated by SVET mapping at various time intervals.

The mechanism of protection (or self-healing) is by passive film formation which is due to its redox activity wherein the emeraldine salt form of PANI present in the coating accepts the electrons released by metal oxidation reaction and reduces to emeraldine base form, forcibly passivating the metal surface. Also during this redox transition, the dopants (phosphate, benzoate, salicylate, benzotriazole, mercaptobenzothiazole and quinoline) in the polymer back bone gets released reinforcing the corrosion protection, which is evidenced by the fact that coatings with "de-doped PANI" do not show self-healing ability, though there is no propagation of corrosion as with "Blank" coating.

SVET Analysis of Primer Coating with
PANI-Benzoate

Example 4: Araldite GY 250, Aradur 2973, 5% Reactive Diluent and 20% PANI-B

FIGS. 3A-3D depict the local current maps over the surface of coated aluminium recorded after exposure to 3.5% NaCl. "Initial" image is recorded after 5 minutes of exposure. A steep anodic current flow in the flaw area indicates the occurrence of accelerated corrosion. With continued exposure, the corrosion activity at the defect areas decreases as evidenced by the decrease in height of the current flow pattern in 6 h and 12 h exposure images. After 24 h of exposure, there is no flow of anodic current (no peaks). This indicates that the PANI dopant has self-healing activity in the epoxy coating on aluminium surface. i.e. the flaw in the coating has healed.

FIG. 3A is an SVET plot for Example 4 (Araldite GY 250, Aradur 2973, 5% Reactive Diluent and 20% PANI-B) at an "initial" time (5 minutes), according to one or more aspects. FIG. 3B is an SVET plot for Example 4 (Araldite GY 250, Aradur 2973, 5% Reactive Diluent and 20% PANI-B) at 6 hours of NaCl exposure, according to one or more aspects. FIG. 3C is an SVET plot for Example 4 (Araldite GY 250, Aradur 2973, 5% Reactive Diluent and 20% PANI-B) at 12 hours of NaCl exposure, according to one or more aspects. FIG. 3D is an SVET plot for Example 4 (Araldite GY 250, Aradur 2973, 5% Reactive Diluent and 20% PANI-B) at 24 hours of NaCl exposure, according to one or more aspects.
SVET Analysis of Primer Coating without PANI (i.e. Blank)

FIGS. 4A-4D depict the local current maps over the surface of coated aluminium recorded after exposure to 3.5% NaCl. "Initial" image is recorded after 5 minutes of exposure. A steep anodic current flow in the flaw area indicates the occurrence of accelerated corrosion. With continued exposure, the corrosion activity at the defect areas increases as evidenced by the increase in height and width of the current flow pattern in 6 h and 12 h exposure images. After 24 h of exposure, there is a large flow of anodic current (many peaks), which indicates that the coating without PANI has no self-healing ability in the epoxy coating on aluminum surface. In addition, the numerous peaks observed in the field indicate the films have poor barrier properties as well.

Figure 4A:
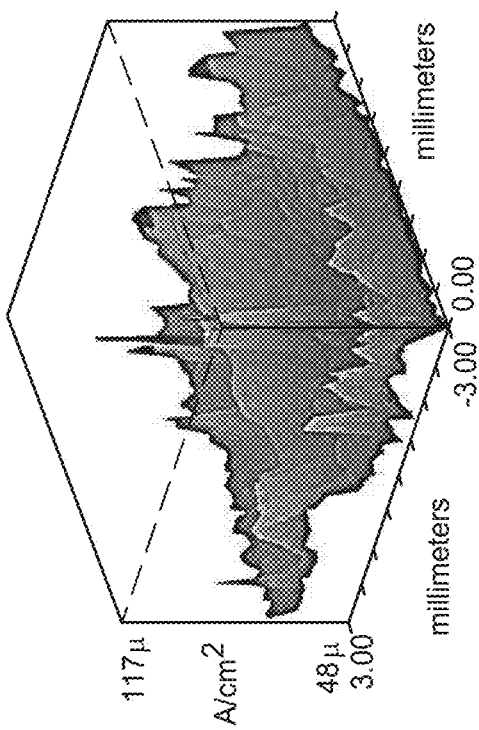
FIG. 4A is an SVET plot for a primer coating without PANI at an "initial" time (5 minutes), according to one or more aspects.
Figure 4B:
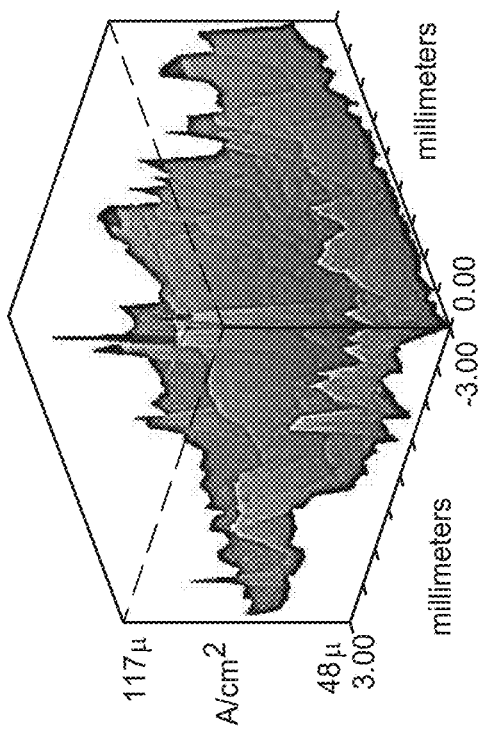
FIG. 4B is an SVET plot for a primer coating without PANI at 6 hours of NaCl exposure, according to one or more aspects.
Figure 4C:
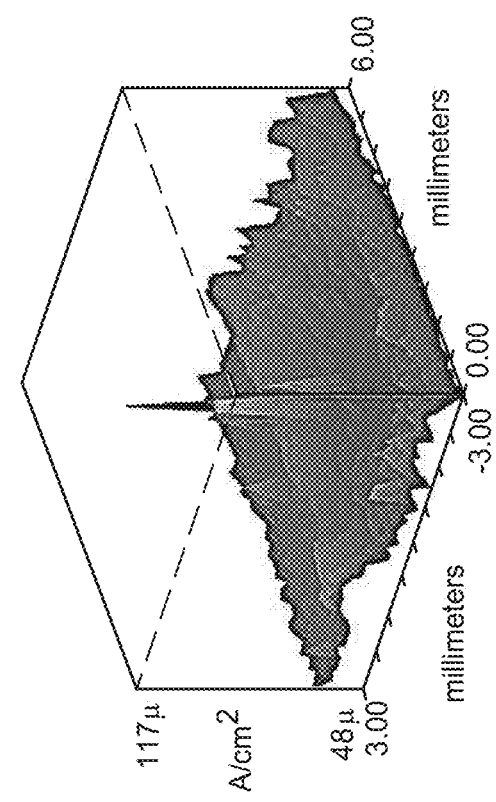
FIG. 4C is an SVET plot for a primer coating without PANI at 12 hours of NaCl exposure, according to one or more aspects.
Figure 4D:
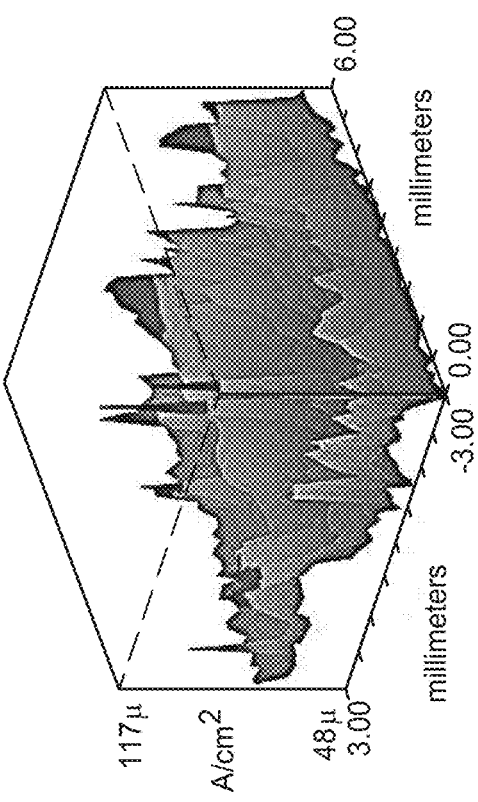
FIG. 4D is an SVET plot for a primer coating without PANI at 24 hours of NaCl exposure, according to one or more aspects.

FIG. 4A is an SVET plot for a primer coating without PANI at an "initial" time (5 minutes), according to one or more aspects. FIG. 4B is an SVET plot for a primer coating without PANI at 6 hours of NaCl exposure, according to one or more aspects. FIG. 4C is an SVET plot for a primer coating without PANI at 12 hours of NaCl exposure, according to one or more aspects. FIG. 4D is an SVET plot for a primer coating without PANI at 24 hours of NaCl exposure, according to one or more aspects.
SVET Analysis of Primer Coating with De-Doped PANI FIGS. 5A-5D depict the local current maps over the surface of coated aluminium recorded after exposure to 3.5% NaCl. "Initial" image is recorded after 5 minutes of exposure. A steep anodic current flow in the flaw area indicates the occurrence of accelerated corrosion. With continued exposure, the corrosion activity at the defect areas doesn't change much as evidenced by the similarity in height and width of the current flow pattern in 6 h and 12 h exposure images. After 24 h of exposure, there it still remains more or less same. This indicates that the coating with "de-doped PANI" has no self-healing ability in the epoxy coating on aluminium surface nor is the corrosion increased as in case of coating without PANI (i.e. Blank).

Figure 5A:
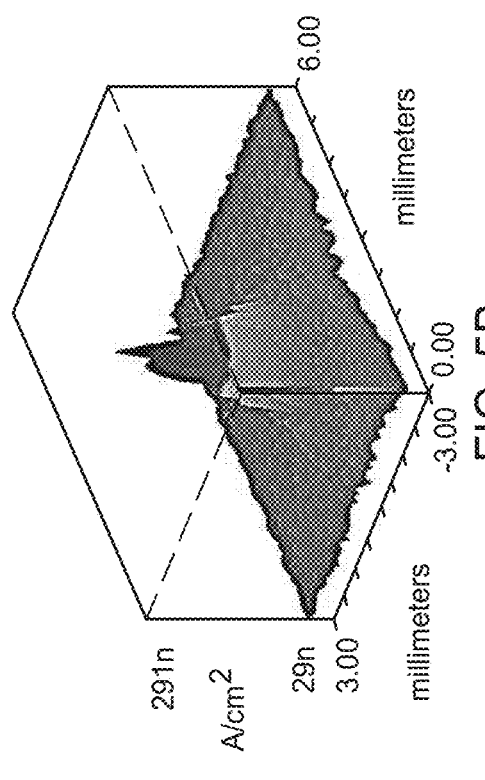
FIG. 5A is an SVET plot for a primer coating having de-doped PANI at an "initial" time (5 minutes), according to one or more aspects.
Figure 5B:
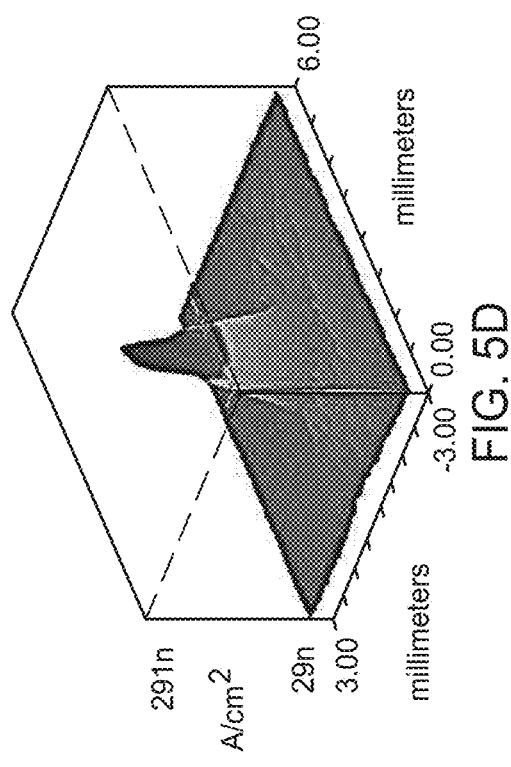
FIG. 5B is an SVET plot for a primer coating having de-doped PANI at 6 hours of NaCl exposure, according to one or more aspects.
Figure 5C:
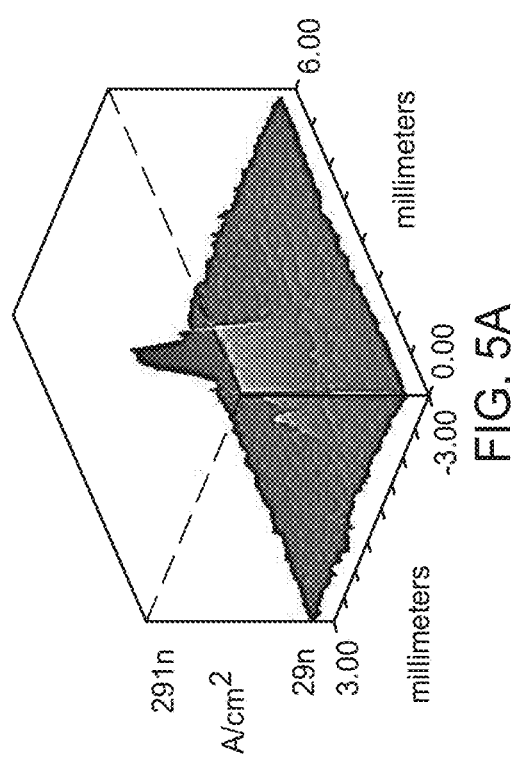
FIG. 5C is an SVET plot for a primer coating having de-doped PANI at 12 hours of NaCl exposure, according to one or more aspects.
Figure 5D:
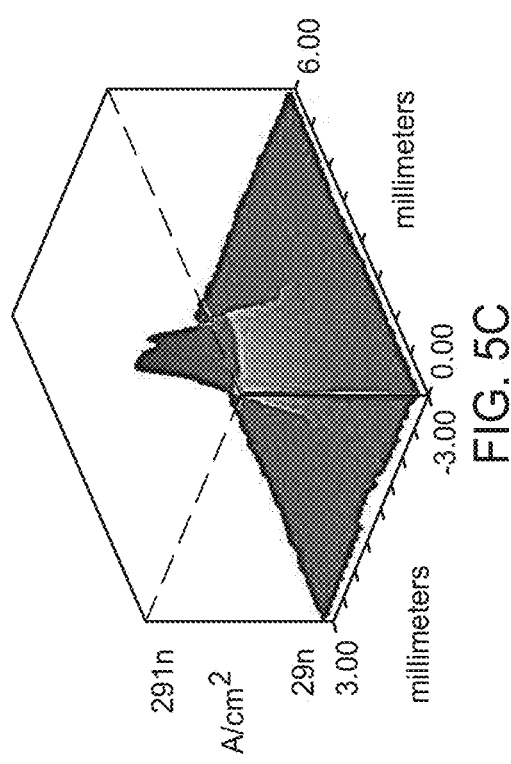
FIG. 5D is an SVET plot for a primer coating having de-doped PANI at 24 hours of NaCl exposure, according to one or more aspects.

FIG. 5A is an SVET plot for a primer coating having de-doped PANI at an "initial" time (5 minutes), according to one or more aspects. FIG. 5B is an SVET plot for a primer coating having de-doped PANI at 6 hours of NaCl exposure, according to one or more aspects. FIG. 5C is an SVET plot for a primer coating having de-doped PANI at 12 hours of NaCl exposure, according to one or more aspects. FIG. 5D is an SVET plot for a primer coating having de-doped PANI at 24 hours of NaCl exposure, according to one or more aspects.
Tafel Polarization Curves The Tafel plot serves as a diagram or illustration of the Tafel equation. This equation is mainly used to understand electrochemical kinetics connecting the overpotential to the electrochemical reaction rate.

The Tafel plot presents the results of the equation and is used to identify information such as Passivity, Corrosion susceptibility, etc. By this technique, the corrosion current ($I_{corr}$) can be measured and used to compute the rate of corrosion. Such plots, together with the equation, can be very useful in depicting the lifespan of materials used in various industries.

A three electrode assembly was connected to the potentiostat and the open circuit potential (OCP) of the painted panel was monitored for 20 minutes for OCP stabilization. Once it reaches steady state, a potential sweep on either side (+ve and −ve) of OCP to an extent of ±250 mV at the scan rate of 0.5 mV/sec on either side was carried out separately in different areas. The Tafel polarization curve was obtained as a plot of log current density (I) versus electrode potential (E) for a specific electrode-electrolyte combination by combining both anodic and cathodic curves in a single plot. The experiments were performed at different locations on the coated surface (surface area exposed to electrolyte=1 sq·cm). Electrolyte used was 3.5% NaCl solution.

Example 5: Araldite GY 250, Aradur 2973, 5% Reactive Diluent and 20% PANI-(Different Dopants)

FIG. 6A is a Tafel polarization curve plot for a primer coating without PANI, according to one or more aspects. FIG. 6B is a Tafel polarization curve plot for a primer coating having PANI-P, according to one or more aspects. FIG. 6C is a Tafel polarization curve plot for a primer coating having PANI-Q, according to one or more aspects. FIG. 6D is a Tafel polarization curve plot for a primer coating having PANI-S, according to one or more aspects.

exposed area was 1.1 cm$^2$ to the solution. The solution of 3.5 wt % NaCl was poured into the glass tube. A platinum foil and a saturated calomel electrode were placed inside the glass tube. Paint was removed in one of the corners of the painted panels to make working electrode contact. This constitutes a three electrode assembly.

The assembly was connected to an electrochemical impedance analyzer. Impedance measurements were carried out in the frequency range of 100 KHz to 0.01 Hz with an A.C. amplitude of 20 mV for different immersion time duration. From the impedance plots, the coating resistance ($R_c$) values were calculated by fitting the experimental values with the simple Randles equivalent circuit using Zsimpwin software.

These coatings were with 20% PANI-dopants and compared with a reference standard pigment Sr-chromate, Blank and de-doped PANI. Coatings with PANI-dopants show better coating resistance.

TABLE 5

| Sample name | Coating resistance (Rc) Ω after 30 days For coated coupons continuously in contact with 3.5% NaCl solution | Coating resistance (Rc) Ω after 60 days For coated coupons continuously in contact with 3.5% NaCl solution | Coating resistance (Rc) Ω after 30 days For coated coupons in 5% Neutral salt spray chamber | Coating resistance (Rc) Ω after 60 days For coated coupons in 5% Neutral salt spray chamber |
|---|---|---|---|---|
| PANI-P | $4.57 \times 10^7$ | $1.19 \times 10^8$ | $2.84 \times 10^9$ | $2.78 \times 10^9$ |
| PANI-B | $1.08 \times 10^7$ | $1.72 \times 10^7$ | $6.46 \times 10^9$ | $3.51 \times 10^7$ |
| PANI-S | $5.75 \times 10^7$ | $5.68 \times 10^7$ | $2.66 \times 10^7$ | $9.85 \times 10^7$ |
| PANI-BTA | $7.68 \times 10^7$ | $1.55 \times 10^7$ | $3.62 \times 10^7$ | $1.14 \times 10^7$ |
| PANI-Q | $3.64 \times 10^8$ | $3.01 \times 10^8$ | $6.64 \times 10^7$ | $6.99 \times 10^7$ |
| PANI-MBT | $7.02 \times 10^8$ | $1.95 \times 10^8$ | $3.62 \times 10^8$ | $4.26 \times 10^7$ |
| PANI-de-doped | $8.16 \times 10^6$ | $3.52 \times 10^6$ | $3.62 \times 10^6$ | $8.76 \times 10^5$ |
| Blank | $1.08 \times 10^7$ | $3.02 \times 10^6$ | $3.52 \times 10^7$ | $1.79 \times 10^6$ |
| Sr-Chromate | $4.62 \times 10^6$ | $4.41 \times 10^6$ | $5.08 \times 10^6$ | $4.83 \times 10^6$ |

From the Tafel curves, values of corrosion current (Icon) were obtained for the different coating systems in 3.5% NaCl.

TABLE 4

| Coating System | $I_{Corr}$ Values A/cm$^2$ | Corrosion rate (mils per year) |
|---|---|---|
| BLANK | $9.69 \times 10^{-6}$ | 4.429 |
| PANI Phosphate (P) | $8.43 \times 10^{-11}$ | $3.85 \times 10^{-5}$ |
| PANI Benzoate (B) | $3.01 \times 10^{-10}$ | $1.40 \times 10^{-4}$ |
| PANI Salicylate (S) | $6.33 \times 10^{-12}$ | $2.89 \times 10^{-6}$ |
| PANI Benzotriazole (BTA) | $1.85 \times 10^{-10}$ | $8.47 \times 10^{-5}$ |
| PANI Mercapto (MBT) | $6.26 \times 10^{-12}$ | $2.86 \times 10^{-6}$ |
| PANI Quinoline (Q) | $1.23 \times 10^{-11}$ | $5.60 \times 10^{-6}$ |
| PANI De-doped (D) | $1.98 \times 10^{-10}$ | $9.06 \times 10^{-5}$ |

The Blank coating (without PANI) shows highest corrosion current, while other coatings with PANI-dopants show corrosion currents that are 4-5 orders of magnitude lower. The coating with de-doped-PANI shows little higher current than the PANI-doped ones. This demonstrates the anti-corrosion and self-healing effects of PANI and doped-PANI in the coatings.

Electrochemical Impedance Spectroscopy—II

Coated coupons were placed in contact with 3.5% NaCl solution for about 60 days and EIS measurements were made on these surfaces intermittently. Other coated coupons were placed in salt (5% NaCl) fog chamber for about 60 days and EIS measurements were made on these surfaces intermittently in 3.5% NaCl solution.

A glass tube of 1.2 cm diameter of length ~3 cm was fixed on the coated aluminium alloy with an adhesive and the The examples mentioned here are for Al alloy 2024, which is more susceptible to corrosion. The coatings should also perform well on other kinds of Al alloys too.

Those familiar with the art of formulating paints and primers will appreciate that various modifications of the ingredients will yield coatings of different compositions and varying properties. Though the examples refer to specific resin systems from well known manufacturers, use of similar resins from others is possible within the scope of the present disclosure. Though polyaniline is used as an example extensively in this disclosure, use of other conjugated polymers such as polypyrrole, polythiophene, etc is possible within the scope of the present disclosure.

Overall, the present disclosure provides compositions, articles thereof, and methods for providing corrosion resistance to substrates provide corrosion protection to substrates in an "on demand" manner in response to a corrosive environment. Furthermore, because of the "on demand" manner of dopant release from a polyaniline, reactivity is reduced between a dopant and an epoxy present in a composition.

As used herein, a "vehicle component" comprises any component of a vehicle, such as a structural component, such as a panel or joint, of an aircraft, automobile, etc. The vehicle component comprises a nose, a fuel tank, a tail cone, a panel, fuselage, a coated lap joint between two or more panels, a wing-to-fuselage assembly, structural aircraft composite, fuselage body-joint, wing rib-to-skin joint, and/or other internal component. Vehicle components also comprise any suitable component of an automobile, marine vehicle, wind turbine, housing/ground structure, drilling apparatus, and the like.

While the foregoing is directed to examples of the present disclosure, other and further examples of the present disclosure may be devised without departing from the basic scope thereof. Furthermore, while the foregoing is directed to methods as applied to vehicle components, e.g. of the aerospace industry, examples of the present disclosure may be directed to other applications not associated with an aircraft, such as applications in the automotive industry, marine industry, energy industry, wind turbines, satellites, and the like.

The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein. While the foregoing is directed to examples of the present disclosure, other and further examples of the present disclosure may be devised without departing from the basic scope thereof. Accordingly, it is not intended that this disclosure be limited thereby. Likewise whenever a composition, an element or a group of elements is preceded with the transitional phrase "including," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A composition comprising:
   an epoxy;
   a hardener comprising an amino hardener or an amido hardener;
   a polyaniline;
   a dopant selected from a triazolyl, a thiazolyl, a quinolinyl, a glycolate, or combination(s) thereof, wherein a combination of the polyaniline and the dopant form a first pigment, the first pigment comprising 6 wt % or less of the composition, the composition comprising a pigment volume concentration of the first pigment in an amount of about 1% to about 25%; and
   a second pigment selected from titanium dioxide, silica, talc, mica, aluminium stearate, or combination(s) thereof,
   wherein the composition comprises a volume solids of about 70% or greater, based on the total volume of the composition.

2. The composition of claim 1, wherein the polyaniline is an emeraldine form of the polyaniline.

3. The composition of claim 1, wherein the composition has a volatile organic content of 300 g/L or less.

4. The composition of claim 1, wherein the composition has a volume solids of about 80% or greater, based on total volume of the composition.

5. The composition of claim 1, wherein the composition comprises the epoxy and hardener in an amount of about 45 wt % to about 85 wt %.

6. The composition of claim 1, wherein the epoxy of the composition comprises one or more epoxies, the one or more epoxies comprising about 40 wt % to about 55 wt % of the composition.

7. The composition of claim 1, wherein the hardener is an amino hardener, the amino hardener comprising about 15 wt % to about 21 wt % of the composition.

8. The composition of claim 1, wherein the hardener is an amido hardener, the amido hardener comprising about 15 wt % to about 21 wt % of the composition.

9. The composition of claim 1, wherein the epoxy is a bisphenol-A epoxy or bisphenol-F epoxy.

10. The composition of claim 1, wherein the composition comprises the first pigment in an amount of about 0.1 wt % to 6 wt %.

11. The composition of claim 1, wherein the composition comprises the first pigment in an amount of about 10% to about 20%, based on Pigment Volume Concentration of the composition.

12. The composition of claim 1, wherein the first pigment comprises a molar ratio of dopant to aniline units of the polyaniline of about 0.3:1 to about 1:1.

13. The composition of claim 1, wherein the dopant is a triazolyl selected from benzotriazole, triazole carboxylic acid, or benzotriazole sulphonic acid.

14. The composition of claim 1, wherein the dopant is a thiazolyl selected from one or more of benzothiazole, thiazole carboxylic acid, or mercaptobenzothiazole.

15. The composition of claim 1, wherein the dopant is a quinolinyl selected from 8-hydroxyquinoline or mercaptoquinoline.

16. The composition of claim 1, wherein the dopant further comprises a salicylate selected from salicylic acid, hydroxybenzoic acids, or salts thereof.

17. The composition of claim 1, wherein the dopant is a glycolate selected from glycolate or thioglycolate.

18. The composition of claim 1, wherein the dopant is further comprises a phosphate selected from phosphoric acid or salt(s) thereof.

19. The composition of claim 1, wherein the wherein the composition has a volatile organic content of 200 g/L to 250 g/L.

* * * * *

UNITED STATES PATENT AND TRADEMARK OFFICE
CERTIFICATE OF CORRECTION

PATENT NO. : 12,448,526 B2  
APPLICATION NO. : 17/407877  
DATED : October 21, 2025  
INVENTOR(S) : Vijaykumar Ijeri et al.

Page 1 of 1

It is certified that error appears in the above-identified patent and that said Letters Patent is hereby corrected as shown below:

In the Claims

Column 20, Line 46, Claim 17: "dopant is" should be -- dopant --.

Signed and Sealed this  
Twenty-third Day of December, 2025

John A. Squires  
*Director of the United States Patent and Trademark Office*